April 21, 1925.
A. M. MacFARLAND
1,534,070
PERCUSSIVE WELDING MACHINE
Filed July 6, 1923
2 Sheets—Sheet 1
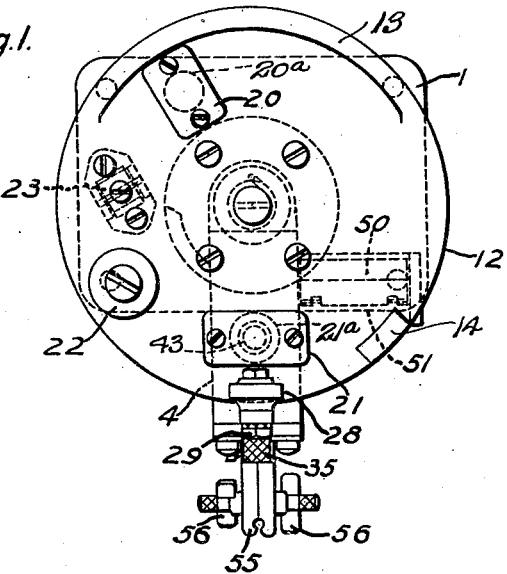
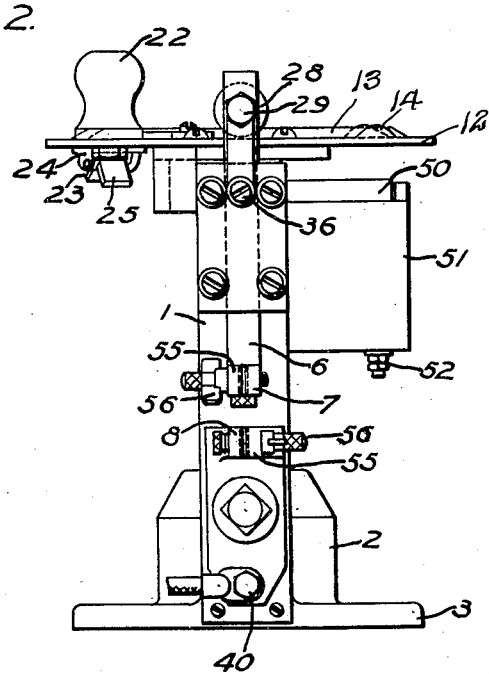
WITNESSES:
Thomas H. English.
W. B. Jaspert.
INVENTOR
Allis M. MacFarland.
BY
Wesley G. Carr
ATTORNEY April 21, 1925.

A. M. MacFARLAND 1,534,070

PERCUSSIVE WELDING MACHINE

Filed July 6, 1923

WITNESSES:

INVENTOR

Allis M. MacFarland.
BY
ATTORNEY

Patented Apr. 21, 1925.

1,534,070

UNITED STATES PATENT OFFICE.

ALLIS M. MacFARLAND, OF WILKINSBURG, PENNSYLVANIA, ASSIGNOR TO WESTINGHOUSE ELECTRIC & MANUFACTURING COMPANY, A CORPORATION OF PENNSYLVANIA.

PERCUSSIVE WELDING MACHINE.

Application filed July 6, 1923. Serial No. 649,887.

*To all whom it may concern:*

Be it known that I, ALLIS M. MACFARLAND, a citizen of the United States, and a resident of Wilkinsburg, in the county of Allegheny and State of Pennsylvania, have invented a new and useful Improvement in Percussive Welding Machines, of which the following is a specification.

My invention relates to electrical welding machines, more especially to welding machines of the percussive type in which the electrodes to be welded are joined by impact after their connecting surfaces have been fused.

It is among the objects of this invention to provide a device of the above general character which shall be of relatively simple and compact construction, which shall comprise a minimum number of parts for a mechanism of this type and which shall not require a skilled operator for its manipulation.

Various types of percussive welding devices have been proposed which embody the principle of securing a pair of electrodes to be welded in suitable electrode holders, one or both of which are movable relatively to each other, such electrodes being connected in a suitable welding circuit, and being further operative to effect contact of the electrodes and to subsequently separate the same to establish a welding arc and bringing the electrodes into percussive engagement to effect a weld or union of their fused surfaces. Most of these devices have been developed for the welding of relatively large bodies and are essentially of a bulky and heavy construction embodying various types of actuating mechanism for operating and timing the electrode members in conjunction with the electrical discharge of the welding circuit.

My present invention is directed to an automatic welding machine which is of relatively small size and working parts and which is adapted to join, by percussive engagement, a pair of electrodes of relatively thin body portion of either like or unlike metals at relatively high speed operation.

The term "percussive engagement" as employed throughout the specification and the appended claims designates the function of engaging the electrodes to effect the weld. While in some instances the engagement of the electrodes must be forcible to forge them after being fused, there are many cases where little or no percussive blow is required. In these cases, the speed of operation is essential to avoid oxidation of the fused surfaces, which need but be touched together to effect a weld.

There are a few metals which may be welded by my device which do not require high speed of operation, or force of impact, for instance, naval brass may be welded to steel plate, or brass may be welded to brass. In this combination, the arc duration may be extended to a period of two or three seconds or even longer and only sufficient force of impact is required to bring the two parts together.

In the accompanying drawings, constituting a part hereof and in which like reference characters designate like parts, Figure 1 is a plan view of a welding machine embodying the principles of this invention;

Fig. 2 is a front elevational view thereof;

Figure 3:
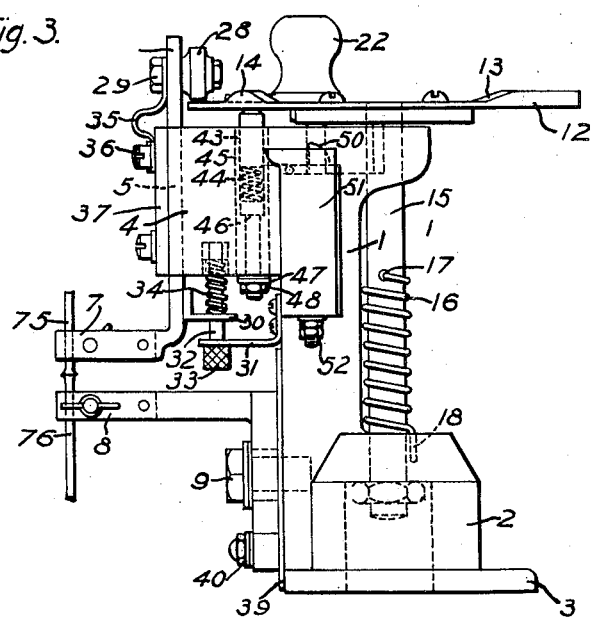
Fig. 3 is a side elevation, illustrating in detail the various operating parts.

Referring to Fig. 3, my device comprises a supporting frame 1 provided with a suitable base portion 2 having a flange member 3, by which it is adapted to be bolted or otherwise secured to a work table or the like. The upper portion of the frame 1 is provided with a projecting body portion 4 having a vertical slot 5, which functions as a guide for a vertically movable arm 6, forming an integral part of an electrode holder 7. Another electrode holder 8 is mounted in co-operative alinement with the member 7 on the frame 1, being secured thereto by a suitable bolt 9.

Secured to the top of a vertical spindle 15 is a rotatable disk or cam member 12 having two angularly spaced cam surfaces 13 and 14 raised above the top face of the disk and disposed at its periphery. As shown in Figs. 1 and 3, the cam surface 13 has a flat upper surface extending around an arc of the disk's periphery. The cam surface 14 has a much smaller arcuate extent and, as shown in Fig. 2, it is raised higher above the disk face than the cam surface 13. The spindle 15 supporting the disk is provided with a torsion spring 16 which is secured, at one end 17, to the spindle and, at its other end 18, to the base 2 of the frame 1. The lower surface of the disk 12 is smooth, to provide the rotatable member of a current-collecting device for a control circuit hereinafter described, said disk having two cut-away portions 20a and 21a, which are filled with insulating members 20 and 21. The top surface of the disk carries a handle member 22 whereby the disk may be turned a partial revolution against the pressure of the torsion spring 16. The disk is further provided with any suitable latch member 23, secured to the under face of the disk, and shown as comprising a swivel bracket 24 having a substantially L-shape finger 25, pivotally mounted at the intersection of its stem and base to the bracket 24.

The arm 6 of the electrode holder 7 bears on the peripheral portion of the top surface of the disk 12, said roller being carried by a stud bolt 29. The arm 6 is further provided, near its lower end, with a backwardly projecting lug 30 which is disposed under the frame extension 4 and over an aligning lug 31 projecting from the side of the base 1. An adjustable screw member 32, having a knurled head 33, is disposed through a plurality of openings provided in the members 30 and 31 and secured, at its opposite end, in the extending portion 4 of the machine frame. A coil spring 34 is interposed between the frame portion 4 and the projecting arm 30 to press down the electrode holder 7.

A flexible conductor 35 is secured, at one end, to the stud bolt 29 and, at its other end, to a screw 36 in the frame which functions as a terminal connection for the arm 6. A clamping plate 37 is fastened to the frame portion 4 to retain the arm 6 in its guide slot 5. The lower electrode 8 is insulated from the base 1 by an insulating strip 39 and is provided with a screw terminal 40 to provide an electrical connection with a welding circuit.

A contact brush 43 of an auxiliary control circuit is pressed, by a spring 44, against the lower face of the disk 12, said brush being vertically mounted in a suitable insulating bushing 45 carried by the frame 1. The lower portion of the spring 44 engages a stud bolt 46 having a threaded terminal member 47 which is provided with a nut 48 to secure a terminal lead of the control circuit.

When the disk 12 is rotated against the torsion of its spring 16, it is held in position by a latch or locking device 50 on the frame, engaging the latch 23 on the underside of the disk. The locking device 50, which may be either manually or electrically operated, is housed in a casing 51 by means of which it is secured to one side of the frame 1, as shown in Fig. 2. In the illustrated embodiment of my invention, the locking device 50 is electrically released by means of current supplied to a terminal 52.

The electrode holders 7 and 8 are provided with movable jaws 55 which are quickly adjustable by wing nuts 56.

Figure 4:
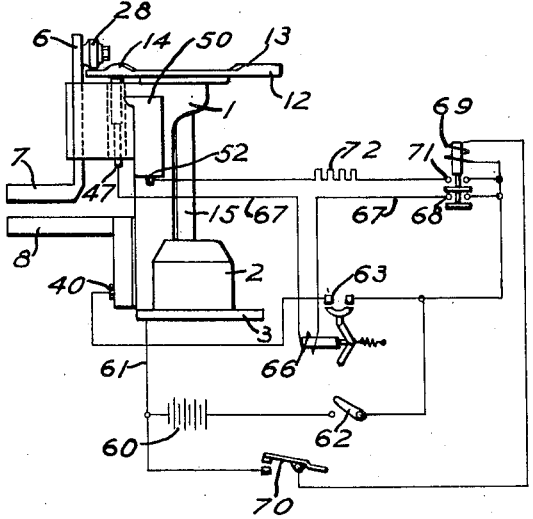
Fig. 4 is a diagrammatic view showing the connections of the welding device with a suitable electrical circuit that is associated therewith.

The above-described mechanism is associated with an electrical welding circuit (Fig. 4) which is supplied with energy from a storage battery 60. The negative terminal of the battery is grounded to the base 2 by a ground lead 61, and the positive terminal is connected, by means of a knife switch 62 and a magnetically actuated switch 63, to the terminal 40 of the lower, or insulated, electrode holder. The magnetically actuated switch 63 is adapted to be closed by a coil 66, which is connected, by a conductor 67 and an electromagnetic switch 68, between the positive terminal of the battery and the terminal 47 of the auxiliary contact brush 43. The electromagnetic switch 68 is operated by a closing coil 69 which is energized by a foot switch 70. The coil 69 also closes a contact 71 to establish a circuit through a resistor 72 to the terminal 52 of the locking mechanism.

The operation of this device is briefly as follows:

The disk 12 is rotated in a clockwise direction, against the pressure of the torsion spring 16, by actuating the handle 22 through an arc of about 240° to engage the latch 23 with the locking means 50. This winding operation places the roller 28 of the upper electrode on the flat elevated cam surface 13, with the insulated portion 20 of the disk in alinement with the auxiliary contact brush 43.

A pair of electrodes 75 and 76 are then clamped in the holders 7 and 8, respectively, so that the ends to be joined engage each other. The knife switch 62 (Fig. 4) being normally closed, the welding machine may be set in motion by closing the foot switch 70 to actuate the closing coil 69 to close the contactors 68 and 71. The closing of the contactors 71 immediately releases the locking mechanism 50 and permits the disk 12 to start to rotate by the pressure of the torsion spring 16. The closing of the contactors 68 does not immediately energize the actuating coil of the main-circuit switch 63, since the auxiliary contact brush 43 is at first on the insulating portion 20 of the disk, as above stated. Almost immediately after the disk starts to rotate, the insulating piece 20 moves out of contact with the brush 43, and a circuit is closed through the grounded frame of the machine, to close the main-circuit switch 63, thereby establishing a circuit between the terminal 40 of the lower electrode holder and the positive side of the storage battery 60. The upper electrode is grounded through the frame 1 to the negative side of the battery, as shown.

As the disk 12 continues to rotate, the roller 28 of the movable electrode holder 7 rolls off the end of the cam surface 13, causing the entire stress of the downwardly pressing spring 34 to be taken up by the contacting electrodes 75 and 76, thus insuring a firm contact and a heavy current-flow prior to the striking of the arc. Just before the end of the movement of the disk, the roller is struck by the cam surface 14, which is slightly higher than the cam surface 13, and the electrodes are separated for a very brief period of time, thereby drawing an arc which fuses the aligning end portions of the electrodes. Immediately thereafter, the cam 14 passes from under the roller 28 and the spring 34 actuates the electrode holder 7 in a downward direction, thereby effecting a sharp impact blow between the electrodes, which causes their joining or union into a unitary member.

As long as the contact member 43 is in engagement with the metallic portion of the cam 12, the circuit across the electrodes is maintained by the coil 66 holding the main circuit switch 63 in a closed position. About the time the second cam 14 strikes the roller 28, either before or after the same, according to the time constants involved, the holding circuit is broken by the passage of the insulated portion 21 of the disk over the auxiliary contact brush 43. The rotation of the disk and the downward movement of the upper electrode holder are so rapid that the arc is struck and the electrodes are forged in a very small fraction of a second, and these processes are all over by the time the main-circuit switch 63 opens after the de-energization of its holding coil 66. In the final position of the parts, as shown in Figs. 1 and 3, the auxiliary control-circuit brush 43 still rests on the insulating portion 21 of the disk, thereby maintaining the main welding circuit open, even though the operator has not had time to release the foot switch 70, so quick is the operation of the instrument. Since the brush 43 is in engagement with the insulating member 21 in the idle position of the instrument, there is alinement with the member 21 in its idle position, there is no possibility of short-circuiting the electrode holders 7 and 8. Likewise, when the insulated portion 20 is in alinement with the plunger 43, that is, in the position when the machine is set against the force of the torsion spring 16, the welding circuit is interrupted and it is only during the working cycle of the rotating cam member that the circuit is established across the electrode members secured in the holders 7 and 8.

It will be readily understood, from the above description of my invention, that a welding machine made in accordance therewith is of relatively simple mechanical construction and that it is further adapted to high speed production in that the manipulation of two devices only is necessary. Such a device is particularly useful in the welding of small current-carrying bodies or other metallic structures which it is desired to join, in that it can be readily set up in a working position on any work bench and requires no great amount of accessory apparatus to carry out its function. The mechanism may also be embodied in a portable frame which can be brought to the work.

Although I have described a specific embodiment of my invention, it will be obvious to those skilled in the art that various modifications may be made in the details of construction. For instance, the general design of the electrode holders, frame, cam and the cam support may be altered in accordance with the requirements of specific service conditions, the actuating members, such as the springs for the movable electrode and the cam stem may be replaced by other suitable parts, and the adjusting means to vary the pressure of the movable electrode holder may be of any suitable kind to permit of varying the tension on the spring member. These and other changes may be made in the details of construction without departing from the principles herein set forth.

I claim as my invention:

1. A welding machine comprising a frame, a stationary and a movable electrode holder mounted thereon, a roller mounted on said movable holder, a circular cam rotatably mounted in said frame and adapted to engage said roller, actuating means on said cam and independent actuating means on said movable holder and means for synchronizing the movements of said cam and holder.

2. A welding machine comprising a frame, a stationary and a movable electrode holder mounted thereon, a cam member mounted on a vertical rotatable spindle in said frame, a cam follower mounted on said movable holder, actuating means for said holder and cam member, and automatic means for co-ordinating the operations thereof.

3. A welding machine comprising a frame, a stationary electrode holder secured thereto, a vertically movable electrode holder provided with a roller mounted in a guideway of said frame, actuating means for said movable holder, a cam member secured to a spindle that is vertically disposed and rotatably mounted in said frame, actuating means for said cam member, means for manually adjusting said cam member and locking it in an operative position and simultaneously adjusting said movable electrode holder, and means for releasing said cam-actuating means to effect an intermittent movement of said movable electrode holder.

4. A welding machine comprising a frame, a stationary electrode holder secured thereto, a vertically movable electrode holder mounted in a guideway of said frame, a spring interposed between said last-named holder and frame, a roller mounted on said movable holder and adapted to engage a spring-actuated cam rotatably mounted in said frame, a tripping device on said cam adapted to engage a locking mechanism, and means for releasing said locking mechanism to actuate said cam and movable holder.

5. A welding machine comprising a frame, a stationary electrode holder secured thereto, a vertically movable electrode holder mounted in a guideway of said frame, an adjustable tension spring interposed between said last-named holder and frame, a follower mounted on said movable holder adapted to engage a spring-actuated cam rotatably mounted in said frame, a tripping device on said cam adapted to engage a locking mechanism, and means for releasing said locking mechanism to actuate said cam and movable holder.

6. A welding machine comprising a frame, a plurality of electrode holders mounted thereon, a cam rotatably mounted in said frame, spring-winding means for placing said cam under tension, means associated with one of said electrode holders to co-operatively engage said cam member under pressure, and means for releasing the tension of said cam to actuate the co-operating electrode holder.

7. A welding machine comprising a frame, a plurality of electrode holders mounted thereon, a cam member journaled in said frame which is adapted to actuate one of said holders, a welding circuit associated with said frame, cam and electrode holders, and means for substantially simultaneously energizing said welding circuit and actuating the operating mechanism of the machine.

8. A welding machine comprising a frame, a plurality of electrode holders mounted thereon, a cam member journaled in said frame which is adapted to actuate one of said holders, a welding circuit associated with said frame, cam and electrode holders, means for adjusting said cam member and locking it in an operative position, and means for substantially simultaneously energizing said welding circuit and releasing said cam-locking means.

9. A welding machine comprising a frame, a plurality of electrode holders mounted thereon, a cam rotatably mounted in said frame, spring-winding means for placing said cam under tension, means associated with one of said electrode holders to co-operatively engage said cam member under pressure, an electrical welding circuit associated with said frame, cam and electrode, and means for substantially simultaneously energizing said circuit and releasing the tension of said cam to actuate the co-operative electrode holder.

10. A welding machine comprising a frame, a plurality of electrode holders mounted thereon, a cam rotatably mounted in said frame, spring-winding means for said cam, means associated with one of said electrode holders to co-operatively engage said cam member under pressure, an electrical welding circuit associated with said frame, cam and electrode, and means for energizing said circuit and automatically releasing the cam to actuate the co-operative electrode holder.

11. In a welding machine, the combination including means for engaging a stationary electrode, a movable electrode holder yieldably pressed toward the stationary electrode, and an auxiliary movable member having a cam surface for engaging said movable holder and separating the electrodes.

12. In a welding machine, the combination including means for engaging a stationary electrode, a movable electrode holder yieldably pressed toward the stationary electrode, an auxiliary movable member having a cam surface for engaging said movable holder and separating the electrodes, a welding circuit for energizing said electrodes, and means responsive to the movement of said auxiliary member for controlling said welding circuit.

13. In a welding machine, the combination including means for engaging a stationary electrode, a movable electrode holder, a guideway for restraining said movable holder to a rectilinear movement, a spring for pressing said movable holder toward the stationary electrode, means for supplying the electrodes with electrical energy, and an auxiliary spring-actuated member having a cam surface engaging said movable holder for separating the electrodes to strike an arc and subsequently permitting the electrodes to be forged by the action of said first-mentioned spring.

14. In a welding machine, the combination including means for engaging a stationary electrode, a movable electrode holder yieldably pressed toward the stationary electrode, restraining means for holding said movable holder in a fixed position and preventing the same from being moved toward the stationary electrode while the electrodes are being adjusted in place, releasing means, operable after said restraining means, for causing the electrodes to engage with a firm pressure, energizing means for causing a heavy electrical current to flow from one electrode to the other, and means, operable after said releasing means, for separating the electrodes to strike an arc and subsequently permitting the yieldable pressure of said movable holder to forge the electrodes.

15. In a welding machine, the combination including means for engaging a stationary electrode, a movable electrode holder yieldably pressed toward the stationary electrode, a shaft mounted in an axis substantially parallel to the path of movement of said movable holder, a disk mounted on said shaft, means for supplying the electrodes with electrical energy, means for imparting a rotary movement to said disk, and means for translating a portion of the kinetic energy of said disk whereby the movable holder is actuated to strike an arc and subsequently forge the electrodes.

16. In a welding machine, the combination including means for engaging a stationary electrode, a movable electrode holder yieldably pressed toward the stationary electrode, a shaft mounted in an axis substantially parallel to the path of movement of said movable holder, a disk mounted on said shaft, means for supplying the electrodes with electrical energy, and means for imparting a rotary movement to said disk, said disk being provided with a cam surface elevated above the face of the disk and disposed near the periphery of the disk for engaging said upper electrode and striking an arc.

17. In a welding machine, the combination including means for engaging a stationary electrode, a movable electrode holder, means for supplying the electrodes with electrical energy, a cam member for controlling the movements of said movable holder, and a single means whereby the cam is set in motion and the electrical energizing means is applied to the electrodes, said cam operating, in its initial position, to hold said movable holder in a fixed position whereby the electrodes may be adjusted in position, said cam further operating, during the course of its movement, to bring the electrodes together with a firm contact, to subsequently separate the electrodes and to finally cause the electrodes to come together with a percussive blow.

In testimony whereof, I have hereunto subscribed my name this 28th day of June, 1923.

ALLIS M. MacFARLAND.

---

Certificate of Correction.

It is hereby certified that in Letters Patent No. 1,534,070, granted April 21, 1925, upon the application of Allis M. MacFarland, of Wilkinsburg, Pennsylvania, for an improvement in "Percussive Welding Machines," an error appears in the printed specification requiring correction as follows: Page 3, lines 50 and 51, strike out the words "alignment with the member 21 in its idle position, there is"; and that the said Letters Patent should be read with this correction therein that the same may conform to the record of the case in the Patent Office.

Signed and sealed this 21st day of July, A. D. 1925.

[SEAL.]

KARL FENNING,
*Acting Commissioner of Patents.*